(12) United States Patent
Raftari et al.

(10) Patent No.: US 6,490,511 B1
(45) Date of Patent: Dec. 3, 2002

(54) TORQUE-BASED MONITOR IN A HYBRID ELECTRIC VEHICLE

(75) Inventors: Abbas Raftari, Northville, MI (US); Deepa Ramaswamy, Ypsilanti, MI (US); Jerry D. Robichaux, Tucson, AZ (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 09/709,612

(22) Filed: Nov. 10, 2000

(51) Int. Cl.⁷ .............................. B60L 3/00; G06F 17/00; G05D 3/00
(52) U.S. Cl. ................ 701/22; 180/65.1; 180/65.3; 290/9; 290/40 C; 318/140; 322/39
(58) Field of Search .................... 701/22; 180/65.1, 180/65.2, 65.3, 65.4, 65.8, 165; 290/7, 9, 14, 17, 18, 19, 27, 36 R, 40 A, 40 C; 318/136, 139, 140; 322/38, 39, 40; 477/5

(56) References Cited

U.S. PATENT DOCUMENTS

| | | |
|---|---|---|
| 5,343,970 A | 9/1994 | Severinsky |
| 5,656,921 A | 8/1997 | Farrell |
| 5,673,668 A | 10/1997 | Pallett |
| 5,806,617 A | 9/1998 | Yamaguchi |
| 6,176,556 B1 * | 1/2001 | Kizer ...................... 303/114.3 |
| 6,176,808 B1 * | 1/2001 | Brown et al. ............... 180/65.2 |
| 6,336,063 B1 * | 1/2001 | Lennevi ..................... 180/65.1 |
| 6,220,223 B1 * | 4/2001 | Weisman et al. ........... 123/352 |
| 6,278,916 B1 * | 8/2001 | Crombez .................... 180/197 |
| 6,307,277 B1 * | 10/2001 | Tamai et al. ............... 180/65.2 |

* cited by examiner

Primary Examiner—Jacques H. Louis-Jacques
(74) Attorney, Agent, or Firm—Carlos L. Hanze (57) ABSTRACT

A torque based monitor method, apparatus, and system, for a torque splitting hybrid electric vehicle (HEV) powertrain and regenerative brake 54 system. The preferred powertrain configuration includes an internal combustion engine 20, generator 32, and electric traction motor 36 combined to produce the vehicle's output shaft torque. The invention has a set of vehicle state sensors and communication interfaces connected independently to a main controller 200 and an independent plausibility check (IPC) 202. The IPC monitors and mitigates the powertrain output shaft torque (OST) by reducing powertrain torque when the detected OST is greater than the desired OST. The IPC has a second mode of operation to shut down the powertrain OST of the HEV powertrain when a fault or failure is detected. Additional features include a quizzer 204 function to continuously verify the functionality of the IPC.

14 Claims, 4 Drawing Sheets

TORQUE-BASED MONITOR IN A HYBRID ELECTRIC VEHICLE

BACKGROUND OF THE INVENTION

1. Field of the Invention

The present invention relates to a toque based monitor of detected output torque of the powertrain of a Hybrid Electric Vehicle ("HEV") and compares it to a desired output torque of the operator.

2. Discussion of the Prior Act

The need to reduce fossil fuel consumption and pollutants from automobiles and other vehicles powered by an internal combustion engines (ICE's) is well known. Vehicles powered by electric motors have attempted to address these needs. However, electric vehicles have limited range and limited power coupled with the substantial time needed to recharge their batteries. An alternative solution is to combine both an ICE and electric traction motor into one vehicle. Such vehicles are typically called hybrid electric vehicles (HEV's). See generally, U.S. Pat. No. 5,343,970 (Severinsky).

The HEV has been described in a variety of configurations. Many HEV patents disclose systems where an operator is required to select between electric and internal combustion operation. In other configurations the electric motor drives one set of wheels and the ICE drives a different set.

Other, more useful, configurations have developed. A series hybrid electric vehicle (SHEV) is a vehicle with an engine (most typically an ICE) which powers a generator. The generator, in turn, provides electricity for a battery and motor coupled to the drive wheels of the vehicle. There is no mechanical connection between the engine and the drive wheels. A parallel hybrid electrical vehicle (PHEV) is a vehicle with an engine (most typically an ICE), battery, and electric motor combined to provide torque to power the wheels of the vehicle.

A parallel/series hybrid electric vehicle (PSHEV) has characteristics of both the PHEV and the SHEV. The PSHEV is also known as a torque (or power) splitting powertrain configuration. Here, the torque output of the engine is given in part to the drive wheels and in part to an electrical generator. The generator powers a battery and motor that also provide torque output. In this configuration, torque output can come from either source or both simultaneously. The vehicle braking system can even deliver torque to drive the generator to produce charge to the battery.

The desirability of combining the ICE with an electric motor is clear. The ICE's fuel consumption and pollutants are reduced with no appreciable loss of performance or range of the vehicle. Nevertheless, there remains substantial room for development of ways to optimize these HEV's operational parameters.

One such area of HEV development is throttle control mechanisms. In prior art throttle controls, a direct physical link (an accelerator cable) between an accelerator pedal (pedal) and a throttle body controls a throttle plate of the ICE. The throttle plate is pulled open by the accelerator cable as the driver depresses the pedal. This increases engine speed and torque. Although simple and dependable, this throttle control method is unable to adapt fuel consumption efficiency to changing traveling conditions.

An electronic throttle control (ETC) is a recent development for improving throttle control and efficient introduction of fuel air mixtures into an engine's cylinders. With the ETC system, the accelerator pedal is no longer mechanically connected to the throttle body. Instead, an actuator positions the throttle plate by a system, process, or apparatus called a powertrain control module (PCM). The PCM determines the desired throttle position based on the accelerator pedal's position sensor. This simple ETC system essentially mimics the conventional mechanical throttle and is often called the "pedal follower" ETC system.

To protect vehicle occupants, ETC systems soon added a second independent processor to detect ETC system failures. This processor determines if the system is in a safe mode of operation. If it is not in safe mode, vehicle operation is restricted and throttle plate control is prohibited.

Ford's second generation ETC (2GETC) systems have added greater vehicle control. These systems no longer control in the "pedal follower" mode, but in a "torque control" mode. Accelerator position, vehicle speed, and barometric pressure in torque control mode are mapped into a desired/demanded driver torque request/wheel torque request. In torque control mode, the PCM can independently control vehicle subsystems such as throttle plate position, transmission gear, transmission slip, ignition timing, and fuel delivery to provide the desired wheel torque. To improve vehicle efficiency, torque control monitor systems add a monitoring scheme to ensure powertrain torque output is not greater than the demanded torque output. See generally, U.S. Pat. No. 5,673,668 to Pallett, et. al. (Ford Global Technologies, Inc.).

Unfortunately, the 2GETC engine torque output comparison is no longer sufficient for HEV. The HEV also has an electric traction drive motor and generator adding torque to the vehicle's powertrain. The ETC for the HEV must establish control of the HEV's entire powertrain. HEV patents that reference ETC's are described in U.S. Pat. No. 5,656,921 to Farrall and U.S. Pat. No. 5,806,617 to Yamaguchi. Yet no one has ever adapted the 2GETC to the HEV.

SUMMARY OF THE INVENTION

The present invention adapts the second generation ETC (2GETC) systems "torque control mode" for an HEV and monitors net output shaft torque and regenerative braking to determine torque demand.

More specifically, the monitor's independent plausibility check (IPC) independently determines the driver's request for output shaft torque of the entire powertrain. This request includes a contribution from the brake control unit to achieve regenerative braking information from the powertrain's electric traction motor and generator. The IPC determines whether the detected torque exceeds the desired torque and mitigates or shuts down torque delivered if necessary. These detection and mitigation (or limiting) systems are key features of this invention.

The monitor's IPC independently estimates output shaft torque during all modes of operation from all sources of torque including: the engine, generator, and motor. For example, the IPC estimates engine torque by using 2 methods, relative throttle position (TP_REL) and mass air flow (MAF). Likewise, the IPC estimates torque produced or absorbed by the motor and generator by comparing a transaxle management unit (TMU) supplied value and with a redundant sensor set. The IPC will also determine inertia torque from the engine and generator components for the transient torque during engine start-up and stop operation.

DETAILED DESCRIPTION OF PREFERRED EMBODIMENT

The present invention generally relates to hybrid electric vehicles (HEVs). It implements a second generation electronic throttle control (2GETC) in the HEV with an integrated system and process for monitoring output shaft torque and regenerative braking.

The HEV powertrain has three main elements that affect torque output to the transaxle output shaft—the generator, engine, and electric traction motor. There are three main configurations of the HEV: parallel, series, and parallel/series. The parallel/series HEV ("torque splitting") configuration is shown as the preferred embodiment. This configuration is provided for demonstration and is not intended to limit the use of the present invention to this configuration only.

Figure 1:
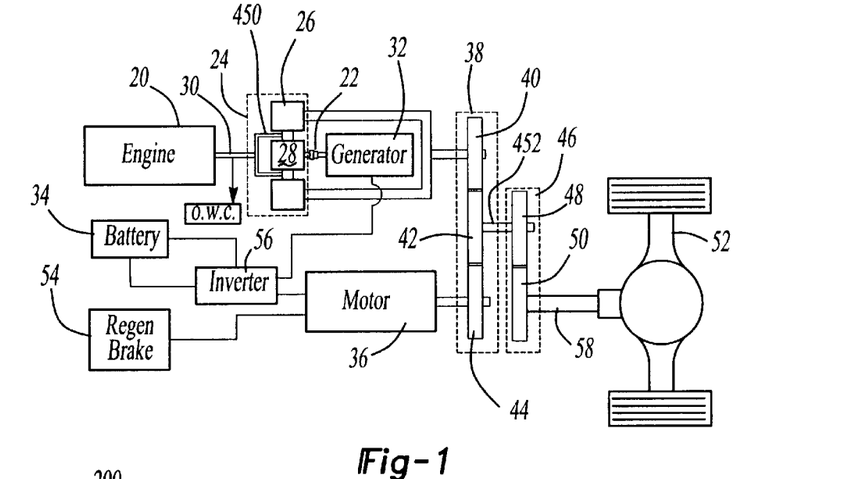
FIG. 1 shows a general torque splitter hybrid electric vehicle configuration.

In FIG. 1, the basic components of the HEV are shown. An engine 20, is linked to a first gear set (typically a planetary gear set) 24 via a one-way clutch 30, having a ring gear 26, a carrier 450, and a sun gear 28. A generator 32 is linked to a generator brake 22, and is also linked to the first gear set 24. A battery 34 is connected to an electric motor 36 and the generator 32 via an inverter 56. The electric motor 36 is connected to a second gear set 38. The second gear set 38 has a first gear 40, a second gear 42, and a third gear 44. The first gear set 24 and second gear set 38 are both coupled to a third gear set 46 by a counter 452. The third gear set has a fourth gear 48 and a fifth gear 50. The third gear set 46 is coupled to a drive shaft system 58, ultimately providing torque to drive to a vehicle's wheels 52. This configuration can also include a regenerative braking system 54 linked to the motor 36 and an inverter 56 linked between the battery 34 and the generator 32 as well as between the battery 34 and the motor 36.

Figure 2:
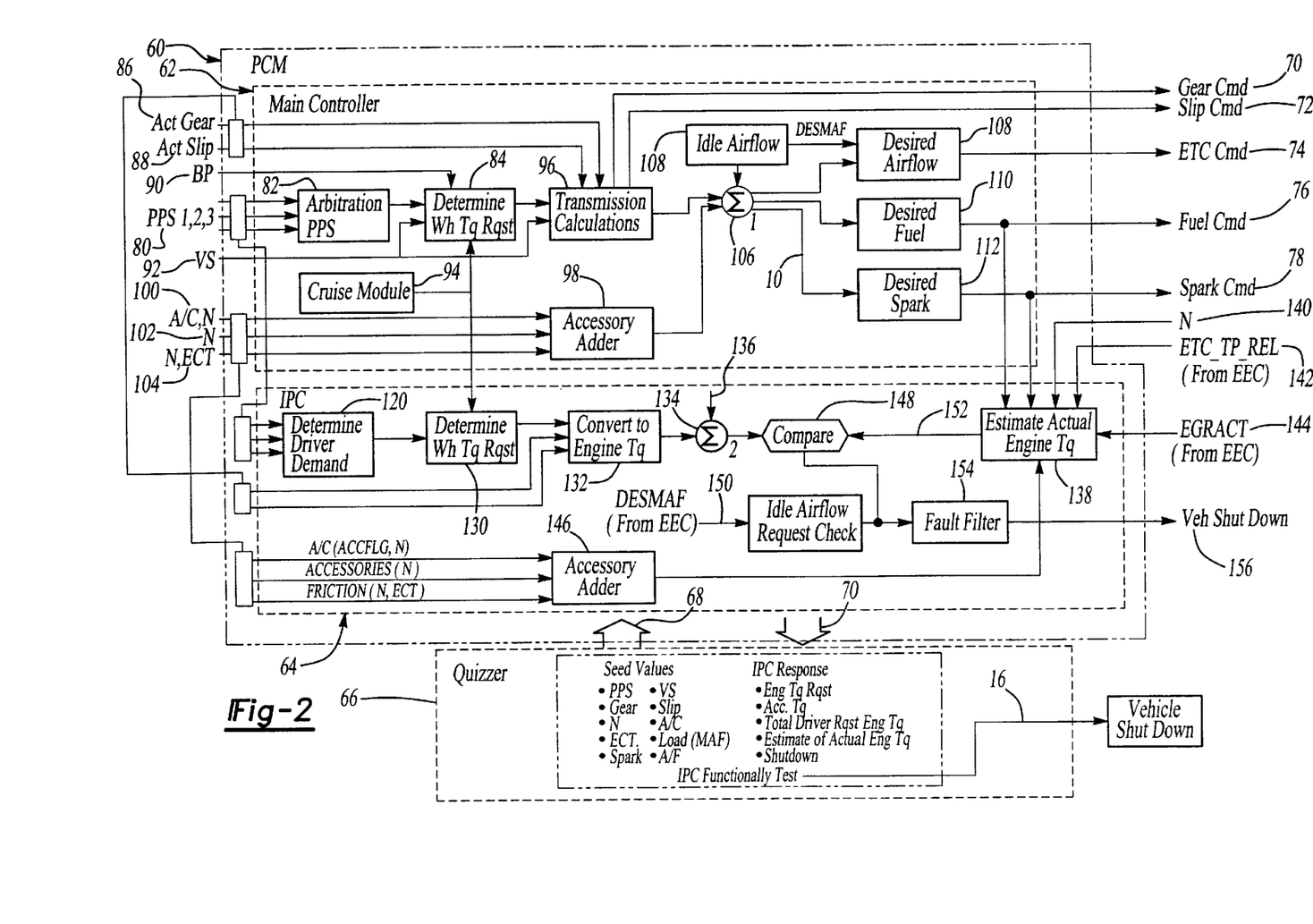
FIG. 2 shows a schematic diagram of the second generation electronic throttle control powertrain control module and monitor design.

A prior art second generation electronic throttle control system (2GETC) is shown in FIG. 2. Generally, a powertrain control module (PCM) 60 is connected to and controls all powertrain functions, including a main controller 62 and an independent plausibility check (IPC) 64. The IPC 64 is a safety feature to independently compare desired and actual torque values via a different calculation path. If a hazardous condition is detected (such as a failure of a system), the PCM 60 mitigates the fault or shuts down the vehicle. The PCM 60, as shown, controls a variety of processes including: transmission gear command 70, transmission slip command 72, engine throttle control command 74, fuel flow command 76, and spark timing command 78.

The main controller 62 receives vehicle state information from sensor output from a variety of vehicle components. Three pedal position sensors (PPS) 80 outputs to an arbitration PPS 82. The redundant sensors help ensure safe operation. If a discrepancy is detected from any of the three sensors, the arbitration PPS 72 eliminates the output of from the erroneous switch.

A wheel torque request process 84 receives the output from the arbitration PPS 82, as well as vehicle speed 92, barometric pressure 90, and cruise wheel torque from the cruise module 94 through communication interfaces. This process determines the desired wheel torque of the operator. A transmission calculation process 96 receives the output from actual transmission gear 86, actual transmission slip 88, wheel torque request 84, and vehicle speed 92. The transmission calculations process 96 outputs the transmission gear command 70 and the transmission slip command 72.

An accessory adder process 98 receives torque load information from a vehicle air conditioner 100, vehicle accessories 102, and other added friction variables (e.g., a water pump) 104. The accessories are basically anything other than drive train load.

A first summation process 106 receives torque trim the output from an idle airflow process 108, the transmission calculations process 96, and the accessory adder 98. The idle airflow process 108 also outputs desired air mass flow to the desired airflow process 108. The first summation process outputs total driver requested torque 10 to the desired airflow process 108, a desired fuel process 110, and a desired spark timing process 112. The desired airflow process 108 then outputs the engine throttle control command 74. The desired fuel process 110 outputs the fuel command 76, and the desired spark process 112 then outputs the spark command 78.

The IPC 64 receives the output from several vehicle components as well as from components of the main controller. The function of the IPC is to test plausibility of the system.

An IPC accessory adder process 146 receives torque load information from the vehicle air conditioner 100, vehicle accessories 102, and added friction variables 104. The process to determine driver demand 120 receives the output from the pedal position sensors 80. A process to determine wheel torque request 130 receives the output from the main controller's cruise module 94 and the IPC's process to determine driver demand 120. A process to convert engine torque 132 receives the output from the process to determine wheel torque request 130, actual transmission gear 86, and actual transmission slip 88. A second summation process 134 receives engine torque request from the process to convert engine torque 132 and EEC torque trim (electronic engine control) 136.

A compare process 148 receives the total engine torque request from the second summation process 134 and compares the value of an estimate of actual engine torque received from an estimate actual engine torque process 138. The estimate actual engine torque process 138 receives the output from the desired fuel process 110, desired spark process 112, an EEC engine speed 140, an EEC relative throttle position 142, an EEC actual exhaust gas recirculating calculation 144, and the IPC accessory adder process 146.

An idle airflow request check 152 receives the output from an EEC desired mass airflow 150. Finally, a fault filter 154 receives the output from the idle airflow request check 152 and the compare process 148. If a fault is detected, the fault filter 154 sends a vehicle shut down command 156.

The next major component of the system is a quizzer 66 as an additional independent monitor to verify proper operation of the PCM 60. The quizzer 66 sends seed values 68 to the PCM 60 for a variety of variables such as: pedal position, vehicle speed, transmission gear, transmission slip, accessories, engine coolant temperature, mass air flow load, spark timing, and air/fuel ratios. The IPC 64 returns a response 70 and an IPC functionality test 16 is performed. If a PCM 60 fault is detected, the monitor shuts down the vehicle.

Figure 3:
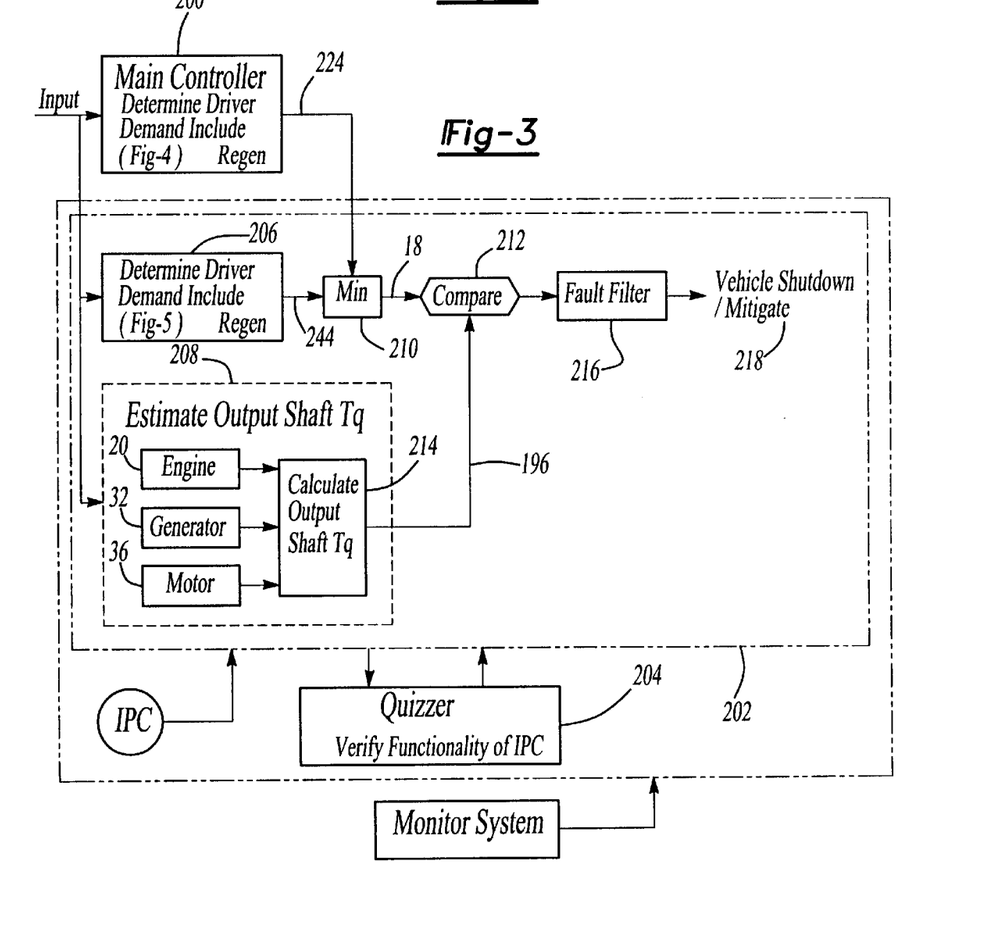
FIG. 3 shows a torque splitter hybrid electric vehicle torque based monitor overview including regenerative brakes.

Applying this monitor scheme to an HEV requires a change from monitoring just engine torque production to estimating and monitoring the output shaft torque production of the entire power train. FIG. 3 provides an overview of a power split HEV torque based monitor method, system, and apparatus (also known as the powertrain control module or PCM). There are similarities to the second generation ETC shown in FIG. 2. This HEV monitor system has: an HEV main controller 200; an enhanced HEV independent plausibility check 202; and a quizzer 204.

HEV main controller 200 is connected to various vehicle outputs (including the regenerative braking system 54) to determine driver torque demand.

The HEV enhanced IPC 202 contains the HEV IPC determination system of a driver torque demand (including regenerative braking) 206; and, an HEV estimate of output shaft torque 208.

The HEV IPC minimizer system 210 compares desired output shaft torque 224 from the HEV main controller 200 and desired output shaft torque from the HEV IPC 224 and outputs the minimal value as a second desired output shaft torque 18 to an HEV IPC comparison system 212.

The HEV IPC 202 contains the HEV IPC output shaft torque system 208 that receives various engine outputs from the vehicle including, the engine 20, generator 32, and motor 36. The HEV IPC estimate output shaft torque system 208 has a process to calculate an output shaft torque 214. Once calculated, an HEV IPC output shaft torque 196 is sent to the HEV IPC comparison system 212. The comparison of the second desired output shaft torque 18 and the estimated output shaft torque 196 is essentially a summation determination which is outputted to an HEV IPC fault filter 216. The HEV IPC fault filter 216 outputs any faults detected in the system to an HEV IPC vehicle shutdown/mitigation (limiting) system 218. The mitigation system 218 allows the limiting or prohibition of powertrain output torque when the output torque 214 is greater than the output torque demanded 210. Additionally, the HEV IPC 202 determines if the delivered output shaft torque is within the requested output shaft torque limits during power on and regenerative braking.

Additionally, the HEV torque based monitor system contains the HEV quizzer 204 to verify functionality of the HEV IPC 202. Similarly, the HEV IPC 202 verifies the functionality of the quizzer 204.

Figure 4:
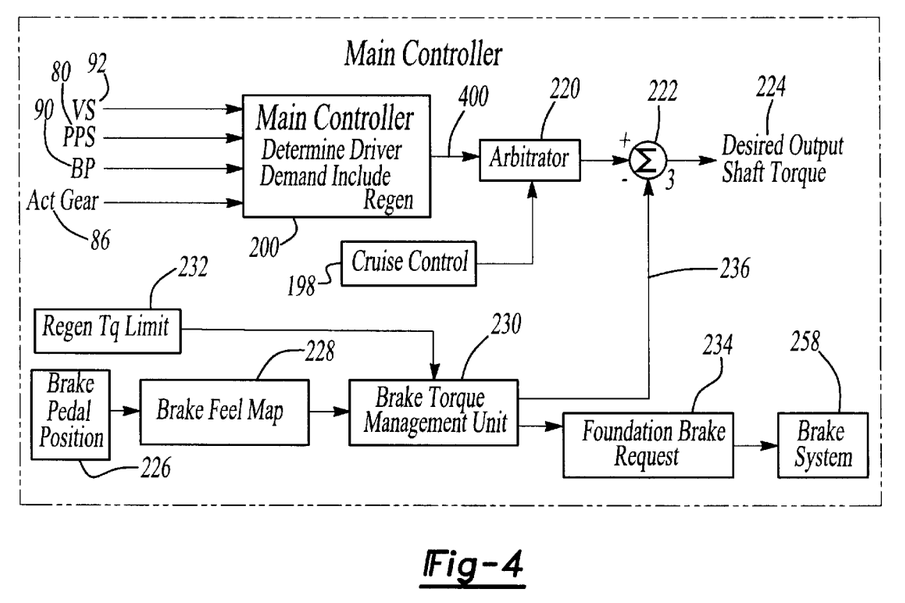
FIG. 4 shows a partial schematic flow diagram of FIG. 3, particularly the main controller determination of desired output shaft torque.

FIG. 4 adds more detail to the HEV torque based monitor system's main controller process to determine a desired output shaft torque 224. The HEV main controller 200 receives from communication interfaces a variety of vehicle state sensory outputs including: vehicle speed 92, pedal position (PPS) 80, barometric pressure 90, and actual transmission gear 86. The HEV main controller 200 uses these outputs and determines an HEV shaft torque request 400 which is sent to an HEV main controller arbitrator 220. The HEV main controller arbitrator 220 also receives the output from a vehicle cruise control 198. The HEV main controller also has a main controller brake feel map system 228 which receives the output from a brake pedal position switch 226. The HEV main controller brake feel map 228 output is sent to an HEV main controller brake torque management unit 230. This unit also receives the output of an HEV regenerative torque limit system 232. The HEV main controller brake torque management unit 230 outputs to an HEV main controller foundation brake request system 234 and an HEV main controller regenerative torque request 236. The HEV main controller foundation brake request 234 is sent to a vehicle's brake system (e.g., brake pads)258.

Two types of brake torque management configurations are possible. The preferred embodiment is called a series brake configuration. In the series configuration, the HEV main controller brake torque management unit 230 output can go to: the HEV main controller regenerative torque request 236 only, the HEV main controller foundation brake request 234 only, or to both in various proportions. A second configuration is called the parallel brake management system. This configuration only allows the output to both in various proportions, i.e., some output will always go to both brake torque management unit outputs.

The HEV main controller regenerative torque request 236 and the output of the HEV main controller arbitrator 220 feed into a third summation process 222 which outputs the HEV main controller desired output shaft torque 224.

Figure 5:
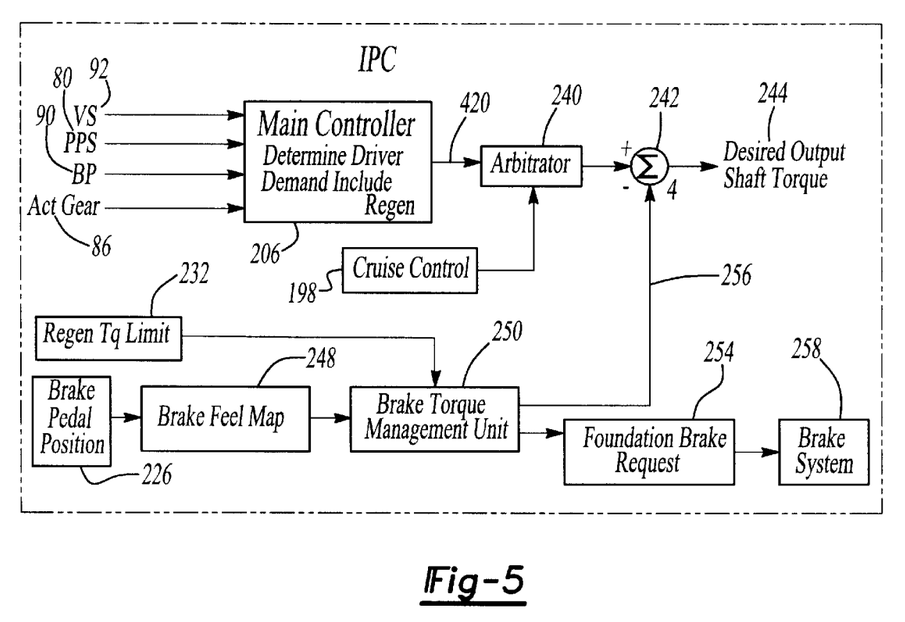
FIG. 5 shows a partial schematic flow diagram of FIG. 3, particularly the IPC determination of desired output shaft torque.

FIG. 5 adds more detail to the HEV torque based monitor system's IPC system to determine an HEV IPC desired output shaft torque 244 (see FIG. 3). This system is essentially redundant to the system of the main controller process to determine HEV IPC desired output shaft torque 224 in FIG. 4. The HEV IPC 206 receives a variety of vehicle state sensory outputs including: vehicle speed 92, pedal position (PPS) 80, barometric pressure 90, and actual transmission gear 86. The HEV IPC 206 uses these outputs and, in turn, outputs an HEV shaft torque request 420 which is sent to an HEV IPC arbitrator 240. The HEV IPC arbitrator 240 also receives the output from the vehicle cruise control 198.

The HEV IPC also has an HEV IPC brake feel map system 248 which receives the output from a brake pedal position switch 226. The HEV IPC brake feel map 248 output is sent to an HEV IPC brake torque management unit 250. This unit also receives the output of the HEV regenerative torque limit system 232. The HEV IPC brake torque management unit 250 outputs to an HEV IPC foundation brake request system 254 and a HEV IPC regenerative torque request 256. The HEV IPC foundation brake request 256 is sent to the vehicle's brake system (e.g., brake pads)258.

Two types of brake torque management configurations are possible. The preferred embodiment is called a series brake configuration. In the series configuration, the HEV IPC brake torque management unit 250 output can go to: the HEV IPC regenerative torque request 256 only, the HEV IPC foundation brake request 254 only, or to both in various proportions. A second configuration is called the parallel brake management system. This configuration only allows the output to both in various proportions, i.e., some output will always go to both brake torque management unit outputs.

The HEV IPC regenerative torque request 256 and the output of the HEV IPC arbitrator 240 feed into a forth summation process 242 which outputs the HEV IPC desired output shaft torque 244.

Figure 6:
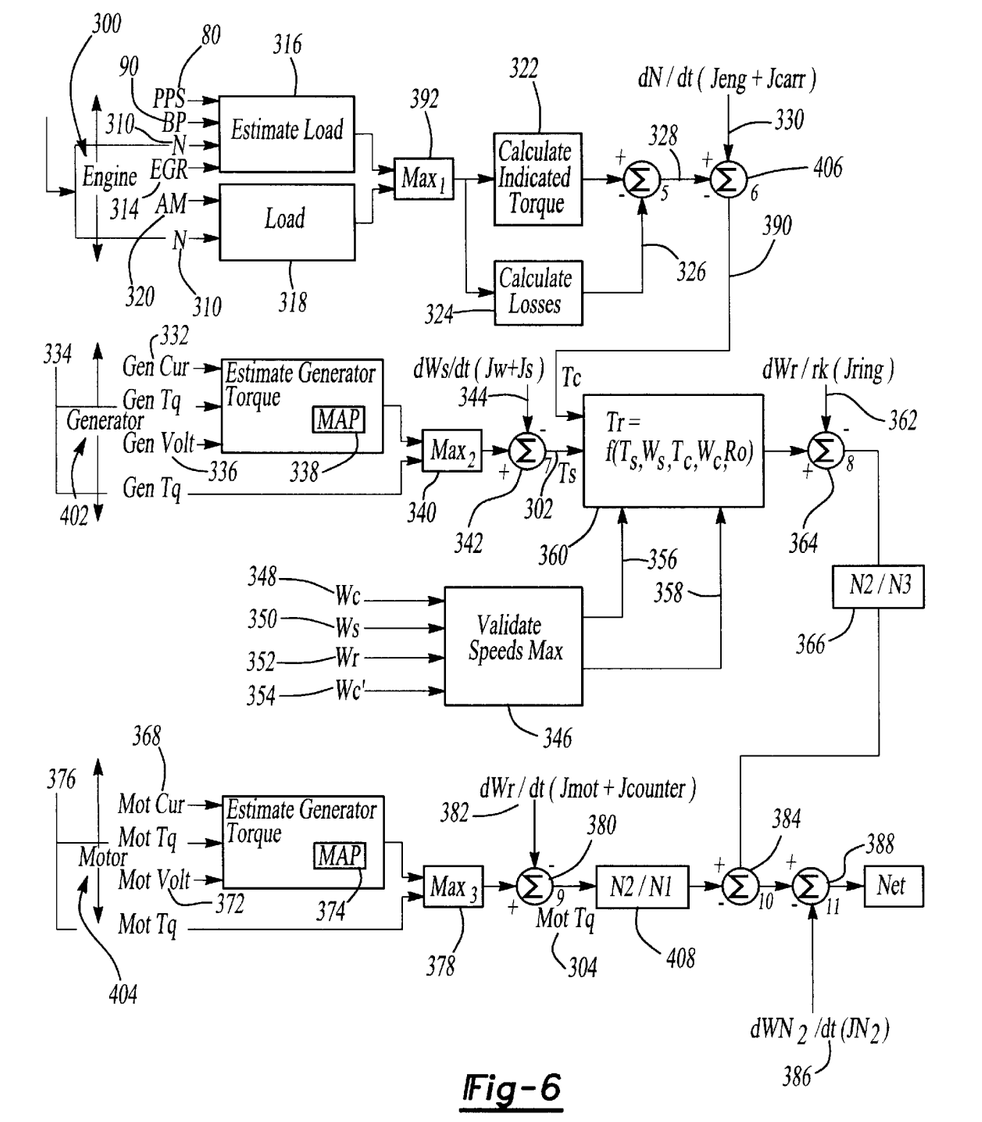
FIG. 6 shows a partial schematic flow diagram of FIG. 3, particularly the IPC determination of detected output shaft torque.

The parallel/series HEV configuration requires enhancement of many other independent plausibility check (IPC)

determinations to obtain the entire vehicle's powertrain output shaft torque. The output torque of the engine 20, the generator 32, and the electric traction motor 36 need to be determined individually then combined to form a single vehicle output shaft torque. The prior art second generation ECT's do not address these necessary enhancements. FIG. 6 shows this HEV IPC output shaft torque system (shown as element 208 in FIG. 3).

In FIG. 6, an IPC HEV engine torque output calculation system 300 receives information from vehicle components similar to most second generation ETC systems. This engine calculation system 300 has an engine estimate load system 316 and an engine load system 318. The engine estimate load system 316 receives an output for engine speed 310, barometric pressure 90, PPS 80, and exhaust gas recirculation 314. The engine load system 318 receives output for air mass 320 and engine speed 310. The output of the engine estimate load system 316 and the engine load system 318 are inputted into a first MAX system 392 where the higher of the two loads is selected and outputted to an indicated torque calculation system 322 and a loss calculation system 324. The loss calculation system 324 includes a torque loss determination of accessory devices (such as the air conditioner, water pump, etc.). The output of the indicated torque calculation system 322 and the loss calculation system is sent to a fifth summation process 326 to determine engine brake torque 328.

Engine inertia torque 330 is determine using the following formula:

$$dN/dt(J\text{-eng}+J\text{-carr})$$

where d=derivative, N=engine speed, t=time, J=inertia, eng= engine 20, and carr=carrier 450.

The engine torque brake 328 and the engine inertia torque 330 are inputted into a sixth summation process 406. The output of this sixth summation process is an engine torque 390.

The next HEV IPC system must estimate the torque output of the generator 32. An IPC HEV calculation of generator torque 402 first receives the output from the generator 32 including generator current 332, generator torque determination by a commercially available system 334, and generator voltage 336. These determinations are inputted into an HEV generator torque map 338. The output from the HEV generator torque map 338 are compared to the generator torque 334 in a second MAX system 340. The greater of the output of the generator map 338 and generator torque 334 is outputted to a seventh summation process 342. Generator inertia torque 344 is determined using the following formula:

$$dWs/dt(J\text{-}W+J\text{-}s)$$

where d 32 derivative, W=generator speed 32, s=sun gear 28, t=time, J=inertia

Generator inertia torque 344 is also inputted into the seventh summation process 342. The output of the seventh summation process 342 is generator torque 302.

Because the engine 20 and the generator 32 are linked to the same first gear system (planetary) 24, their combined torque to the ring gear 26 must be determined. A ring gear torque 360 determination process receives the engine torque 390 and the generator torque 302. An additional process needed to determine the combined torque of the ring gear 26 is a maximum speed validation process 346. This validation process 346 receives carrier 450 speed 354, sun gear 28 speed 350, ring gear 26 speed 352, and the entire monitor's (PCM's) carrier 450 speed 354 and takes the maximum values and outputs a max carrier 450 speed 356 and a max sun gear speed 358.

Ring gear torque 360 is calculated as a function:

$$f(Ts, Ws, Tc, Wc, \rho)$$

where T=torque, W=speed, s=sun gear 28, c=carrier 450, and ρ=ratio of the sun gear and ring gear A derivative ring gear speed 362 must also be calculated using the following formula:

$$dWr/dt(J\text{-}r)$$

where d is the derivative, W=speed, r=ring gear 26, t=time, and J=inertia.

The output of the derivative ring gear speed 362 and the ring gear torque 360 is inputted into an eighth summation process 364 which is in turn outputted into a first gear ratio calculation process 366 determining the ratio of the second gear 42 over the first gear 40.

Next, the system must estimate the torque output of the electric traction motor (motor) 36. The IPC HEV motor torque output determination system 404 first receives the output from the motor 36. A motor current 368, a motor torque from a commercially available source 376, and a motor voltage 372 are inputted into a motor torque map 374. The output from this map 374 is compared to the motor torque determination by a commercially available system 376 in a third MAX system 378. The greater of the output of the motor map 374 and the motor speed 372 is outputted to a ninth summation process 380.

Motor inertia torque 382 is determined using the following formula:

$$dWr/dt(J\text{-mot}+J\text{-counter})$$

where d=derivative, W=motor 36 speed, r=ring gear, t=time, J=inertia, mot=motor 36, and counter=counter 452

Motor inertia torque 382 is also inputted into a ninth summation process 380. The output of the ninth summation process 382 is an HEV motor torque 304. The HEV motor torque 304 is inputted into a second gear ratio calculation process 408 and determines the ratio of the second gear 42 over the third gear 44.

Once the estimates of the output torque of the engine 20, generator 32 (first gear ratio calculation process 366), and motor 36 (second gear ratio calculation process 382) are determined they are combined into a tenth summation process 384.

This system must finally determine an inertia torque of the second gear 386 using the following formula:

$$dWN/dt(jn)$$

where d=derivative, w=motor 36 speed, n=the second gear 42, t=time, and j=inertia The output of the tenth summation process 384 and output of the inertia torque of the second gear 386 are inputted into an eleventh summation process 388 to provide the net output shaft torque 196.

What is claimed is:

1. An apparatus for a torque based monitor of a torque splitting hybrid electric vehicle powertrain and regenerative brake system in a powertrain control module comprising:

a main controller;

a set of vehicle state sensors;

the main controller and the vehicle state sensors connected through communication interfaces;

an independent plausibility check, connected to the vehicle state sensors and communication interfaces but independent of the main controller, including a first operating mode comprising a first comparison device to determine whether detected output shaft torque is greater than desired output shaft torque, and a second operating mode limiting function of a torque output of the hybrid electric vehicle powertrain when a detected output shaft torque is greater than a desired output shaft torque;

the second operating mode further comprising a shut down determination of the torque output of the hybrid electric vehicle powertrain when a fault is detected in the powertrain control module;

the main controller determines a main controller desired output shaft torque from the vehicle state sensors and the independent plausibility check independently determines an independent plausibility check desired output shaft torque from the vehicle state sensors; and the independent plausibility check includes a minimizer which determines a vehicle desired output shaft torque as smaller of the main controller desired output shaft torque and the independent plausibility check desired output shaft torque.

2. The apparatus of claim 1, further comprising a quizzing device connected to the independent plausibility check to verify functionality of the independent plausibility check, wherein the quizzing device seeds the independent plausibility check with vehicle state values; receives an independent plausibility check response; performs a functionality test; and shuts down the torque output of the hybrid electric vehicle powertrain if a fault is detected.

3. The apparatus of claim 1, wherein the independent plausibility check comprises:
a device to determine vehicle detected output shaft torque by combining output shaft torques of an internal combustion engine, a generator, and an electric traction motor, all connected to the independent plausibility check through the vehicle state sensors and the communication interfaces.

4. The apparatus of claim 3, wherein a second comparison device compares the vehicle desired output shaft torque to the detected output shaft torque and processed through a fault filter, the fault filter determining mitigation or hybrid electric vehicle shutdown when detected output shaft torque is greater than desired output shaft torque or a powertrain control module fault is detected.

5. A torque based monitor system to control a torque splitting hybrid electric vehicle powertrain and regenerative brake system including a powertrain control module having a main controller processor comprising:
an independent plausibility check processor independent of the main controller processor, the independent plausibility check processor performing a monitoring function in a first operating mode including reading a set of vehicle state sensors and communication interfaces shared with the main controller processor and determining when detected output shaft torque is greater than desired output shaft torque;
the independent plausibility check processor performing a limiting function of torque output of the hybrid electric vehicle powertrain in a second operating mode by limiting detected output shaft torque to less than desired output shaft torque when detected output shaft torque is greater than desired output shaft torque;
the independent plausibility check processor performing a shut down function of the torque output of the hybrid electric vehicle powertrain in the second operating mode when a fault is detected in the powertrain control module;

the main controller processor determining a main controller desired output shaft torque from the vehicle state sensors and the independent plausibility check processor independently determining an independent plausibility check desired output shaft torque from the vehicle state sensors; and the independent plausibility check processor includes a minimizer function, wherein the minimizer function determines a vehicle desired output shaft torque as the smaller of the main controller desired output shaft torque and the independent plausibility check desired output shaft torque.

6. The torque based monitor system of claim 5, further comprising a quizzing processor function ordered to verify the functionality of the independent plausibility check processor, wherein the quizzing processor function seeds the independent plausibility check processor with vehicle state values;
receives an independent plausibility check processor response;
performs a functionality test; and
shuts down torque output of the hybrid electric vehicle powertrain if a fault is detected.

7. The torque based monitor system of claim 5, wherein the independent plausibility check processor is ordered, through a summation function, to combine the torque output of an internal combustion engine, a generator, and an electric traction motor through the vehicle state sensors and communication interfaces to determine detected output shaft torque.

8. The torque based monitor system of claim 7, wherein a compare function compares the vehicle desired output shaft torque to the detected output shaft torque.

9. The torque based monitor system of claim 8, wherein the compare function is processed through a fault filter function, the fault filter function determining hybrid electric vehicle powertrain torque mitigation or shutdown when detected output shaft torque is greater than desired output shaft torque.

10. A method for monitoring torque of a torque splitting hybrid electric vehicle powertrain and regenerative braking system with a powertrain control module having a main controller comprising the steps of:
monitoring a set of vehicle state sensors and communication interfaces through the main controller;
determining a main controller detected output shaft torque from the vehicle state sensors;
determining when the main controller detected output shaft torque is greater than a main controller desired output shaft torque;
monitoring the set of vehicle state sensors and communication interfaces shared with the main controller through an independent plausibility check;
determining an independent plausibility check detected output shaft torque from the vehicle state sensors;
determining when the independent plausibility check detected output shaft torque is greater than an independent plausibility check desired output shaft torque;
limiting torque output of the hybrid electric vehicle powertrain when the independent plausibility check detected output shaft torque is greater than the independent plausibility check desired output shaft torque;

shutting down torque output of the hybrid electric vehicle powertrain when a fault is detected in the powertrain control module;

comparing the main controller desired output shaft torque with the independent plausibility check desired output shaft torque; and choosing the smaller of the main controller desired output shaft torque and the independent plausibility check desired output shaft torque.

11. The method for monitoring torque of claim 10 further comprising the steps of:

quizzing the independent plausibility check to verify functionality of the independent plausibility check processor, including seeding the independent plausibility check processor with vehicle state values;

receiving an independent plausibility check processor response;

performing a functionality test; and shutting down torque output of the hybrid electric vehicle powertrain if a fault is detected.

12. The method for monitoring torque of claim 10, wherein the step of determining an independent plausibility check detected output shaft torque comprises:

summing combined torque output of an internal combustion engine, a generator, and an electric traction motor through the vehicle state sensors and communication interfaces.

13. The method for monitoring torque of claim 12, wherein the step of determining when the independent plausibility check detected output shaft torque is greater than the independent plausibility check desired output shaft torque comprises the step of:

comparing the vehicle desired output shaft torque to the detected output shaft torque.

14. The method for monitoring torque of claim 13, further comprising the steps of:

filtering the compared independent plausibility check detected output shaft torque to the vehicle desired output shaft torque through a fault filter; and mitigating torque output or shutting down the hybrid electric vehicle powertrain when detected output shaft torque is greater than desired output shaft torque or a fault in the powertrain control module is detected.

* * * * *